(12) United States Patent
Kim

(10) Patent No.: US 8,824,985 B2
(45) Date of Patent: *Sep. 2, 2014

(54) MOBILE DEVICE AND METHOD FOR CONTROLLING THE SAME

(71) Applicant: LG Electronics Inc., Seoul (KR)

(72) Inventor: Sungyup Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/219,881

(22) Filed: Mar. 19, 2014

(65) Prior Publication Data

US 2014/0206316 A1    Jul. 24, 2014

Related U.S. Application Data

(63) Continuation of application No. 13/829,992, filed on Mar. 14, 2013.

(60) Provisional application No. 61/730,977, filed on Nov. 29, 2012.

(30) Foreign Application Priority Data

Jan. 28, 2013  (KR) .................. 10-2013-0009050
Feb. 26, 2013  (KR) .................. 10-2013-0020481

(51) Int. Cl.
*H04B 1/04*   (2006.01)
*H04W 12/08*  (2009.01)

(52) U.S. Cl.
CPC  *H04W 12/08* (2013.01); *H04B 1/04* (2013.01)
USPC .................. 455/127.4; 455/550.1; 455/552.1; 455/410

(58) Field of Classification Search
CPC ..................................... H04W 12/08
USPC ............ 455/127.4, 550.1, 552.1, 553.1, 407, 455/411, 425, 556.2, 566, 26.1
See application file for complete search history.

(56) References Cited

U.S. PATENT DOCUMENTS 6,608,548 B1   8/2003  Pellaton et al.
7,046,135 B2 *  5/2006  Blanpain .................... 340/539.1

(Continued)

FOREIGN PATENT DOCUMENTS

KR   10-2011-0042634 A   4/2011
KR   10-2011-0080398 A   7/2011
KR   10-2012-0006696 A   1/2012

*Primary Examiner* — Dominic E Rego
(74) *Attorney, Agent, or Firm* — Birch, Stewart, Kolasch & Birch, LLP

(57) ABSTRACT

A mobile device configured to display at least one application executed in the first mode and the second mode respectively; a sensor unit configured to sense a user input for the mobile device; and a processor configured to: provide an unlock interface to unlock a lock state of the first mode or the second mode, display at least one application executed in the first mode and maintain the second mode in the lock state when the mobile device unlocks the first mode and enters into the first mode through the unlock interface, detect an event for the second mode in the first mode even though the second mode is in the lock state, indicate information related to the event for the second mode in the first mode, and process the event when the mobile device unlocks the second mode and enters into the second mode through the unlock interface.

31 Claims, 17 Drawing Sheets

(56) References Cited

U.S. PATENT DOCUMENTS

| | | |
|---|---|---|
| 7,248,867 B2 | 7/2007 | Strawn |
| 7,929,993 B2 | 4/2011 | Nagarajan |
| 8,108,591 B2 | 1/2012 | Ito |
| 8,174,503 B2 | 5/2012 | Chin |
| 2005/0037732 A1 | 2/2005 | Kotzin |
| 2006/0084424 A1 | 4/2006 | Strawn |
| 2007/0225022 A1 | 9/2007 | Satake |
| 2008/0039140 A1 | 2/2008 | Morris et al. |
| 2008/0318616 A1 | 12/2008 | Chipalkatti et al. |
| 2009/0241072 A1* | 9/2009 | Chaudhri et al. ............. 715/863 |
| 2009/0319692 A1* | 12/2009 | Liu et al. ........................... 710/3 |
| 2010/0235732 A1 | 9/2010 | Bergman |
| 2011/0130170 A1 | 6/2011 | Han et al. |
| 2011/0163972 A1* | 7/2011 | Anzures et al. ............... 345/173 |
| 2012/0021724 A1 | 1/2012 | Olsen et al. |
| 2012/0303476 A1 | 11/2012 | Krzyzanowski et al. |
| 2013/0086956 A1 | 4/2013 | Nave |
| 2013/0109426 A1* | 5/2013 | Kerger et al. ................. 455/518 |
| 2013/0111579 A1* | 5/2013 | Newman et al. ................ 726/17 |
| 2013/0191911 A1* | 7/2013 | Dellinger et al. ............... 726/19 |

\* cited by examiner (a)

(b)

(c)

(a)　　　　　　　　　　　　　(b)

(a)  (b)

(a)  (b)

(a)  (b)  (c)

MOBILE DEVICE AND METHOD FOR CONTROLLING THE SAME

This application is a continuation of U.S. patent application Ser. No. 13/829,992, filed on Mar. 14, 2013, which claims the benefit of U.S. Provisional Application No. 61/730,977, filed on Nov. 29, 2012, the Korean Patent Application Nos. 10-2013-0009050, filed on Jan. 28, 2013 and 10-2013-0020481, filed on Feb. 26, 2013, which are all hereby incorporated by reference as if fully set forth herein.

BACKGROUND OF THE INVENTION

1. Field of the Invention

The present specification relates to a mobile device and a method for controlling the same, and more particularly, to a mobile device and a method for controlling the same, in which different lock states are provided depending on a mode which is currently being implemented in a dual mode of a child mode and an adult mode and different unlock interfaces are provided depending on the lock state which is set.

2. Discussion of the Related Art

With the development of electronic devices and communication technologies, users could perform various functions that include text message transmission and reception functions and phone communication by using a mobile device. In particular, with the mass spread of smart phones, various applications have been developed together. Accordingly, the users could install an application having a desired function in the mobile device and perform various functions such as games and Internet banking.

In particular, various animation applications that play animations which children likes and various children's song applications that play children's songs which children likes have been provided recently. Accordingly, a user who is a mother or father of a child may implement animation applications or children's song applications installed in his/her mobile device to allow the child to use the applications.

However, when the child is using the mobile device of the user, a call or text message for a task of the user may be received. At this time, if the child of the user receives the call or text message, a problem occurs in that the user may miss an important contact. Particularly, if the child is too young, such a problem may be likely to occur.

SUMMARY OF THE INVENTION

Accordingly, the present specification is directed to a mobile device and a method for controlling the same, which substantially obviate one or more problems due to limitations and disadvantages of the related art.

An object of the present specification is to provide a mobile device and a method for controlling the same, in which a dual mode of a child mode and an adult mode is provided.

Another object of the present specification is to provide a mobile device and a method for controlling the same, in which different lock states of a first lock state and a second lock state are provided, and different unlock interfaces are provided depending on the lock state.

Still another object of the present specification is to provide a mobile device and a method for controlling the same, in which an enter mode (child mode or adult mode) after a lock state is unlocked is varied depending on a first unlock interface unlocking a first lock state and a second unlock interface unlocking a second lock state.

Further still another object of the present specification is to provide a mobile device and a method for controlling the same, in which an adult mode is implemented to process an event for the adult mode when the event for the adult mode occurs while the mobile device is being used in a child mode.

Further still another object of the present specification is to provide a mobile device and a method for controlling the same, in which an application implemented in a child mode and an application implemented in an adult mode are provided separately and detailed configuration of an application may be set in a corresponding mode which is being implemented.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a mobile device providing a dual mode of a child mode and an adult mode comprises a display unit configured to display at least one application implemented in the child mode and the adult mode; a sensor unit configured to sense a user input for the mobile device and transferring a signal based on the sensed result to a processor; and the processor configured to control the display unit and the sensor unit, wherein the processor further configured to: provide a first unlock interface to unlock a first lock state, wherein the first unlock interface allows the mobile device to enter into the child mode or the adult mode after unlocking the first lock state, display at least one application implemented in the child mode if it enters into the child mode through the first unlock interface, enter a second lock state when an event for the adult mode is detected, and provide a second unlock interface to unlock the second lock state, wherein the second unlock interface allows the mobile device to enter into the adult mode only after unlocking the second lock state.

A method for controlling a mobile device, which provides a dual mode of a child mode and an adult mode, comprises providing a first unlock interface to unlock a first lock state, wherein the first unlock interface allows the mobile device to enter into the child mode or the adult mode after unlocking the first lock state; displaying at least one application implemented in the child mode when the mobile device enters into the child mode through the first unlock interface; detecting an event for the adult mode in the child mode; entering a second lock state; and providing a second unlock interface to unlock the second lock state, wherein the second unlock interface allows the mobile device to enter into the adult mode only after unlocking the second lock state.

According to the one embodiment, the mobile device may provide a dual mode of a child mode and an adult mode so as to provide a user with different applications and different functions per mode. As a result, the user may use a function of a normal mobile device in an adult mode as it is and may limit the function of the mobile device to play of a child in a child mode. Accordingly, the user of the mobile device may prevent the child from changing configuration of the mobile device.

Also, according to another embodiment, the mobile device may provide lock states (first lock state and second lock state) separately and provide different unlock interfaces performing unlocking in accordance with the lock state. Accordingly, the mobile device may set different lock states as the case may be, thereby restricting a mode which the user enters.

Also, according to still another embodiment, if the mobile device of the child mode detects an event of an adult mode, the user may prevent the child from processing the event by setting the second lock state allowing entrance to the adult mode only.

Also, according to further still another embodiment, the mobile device may separately provide an application implemented in a child mode and an application implemented in an adult mode, whereby the adult may set the application that may be used by the child.

Finally, according to further still another embodiment, the mobile device may allow detailed configuration of an application to be set in a corresponding mode which is being implemented, whereby the child may set the configuration of the application implemented in the child mode. Accordingly, the child may feel that he/she plays his/her own mobile device.

More detailed advantageous effects will be described hereinafter.

It is to be understood that both the foregoing general description and the following detailed description of the present specification are exemplary and explanatory and are intended to provide further explanation of the specification as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings.

DETAILED DESCRIPTION OF THE INVENTION

Reference will now be made in detail to the preferred embodiments of the present specification, examples of which are illustrated in the accompanying drawings. Wherever possible, the same reference numbers will be used throughout the drawings to refer to the same or like parts. The embodiments of the present specification shown in the accompanying drawings and described by the drawings are only exemplary, and technical spirits of the present specification and its main operation are not limited by such embodiments.

Although the terms used in the present specification are selected from generally known and used terms considering their functions in the present specification, the terms can be modified depending on intention of a person skilled in the art, practices, or the advent of new technology. Also, in special case, the terms mentioned in the description of the present specification may be selected by the applicant at his or her discretion, the detailed meanings of which are described in relevant parts of the description herein. Accordingly, the terms used herein should be understood not simply by the actual terms used but by the meaning lying within and the description disclosed herein.

Although the embodiments will be described in detail with reference to the accompanying drawings and the disclosure described by the drawings, it is to be understood that the present specification is not limited by such embodiments.

Figure 1:
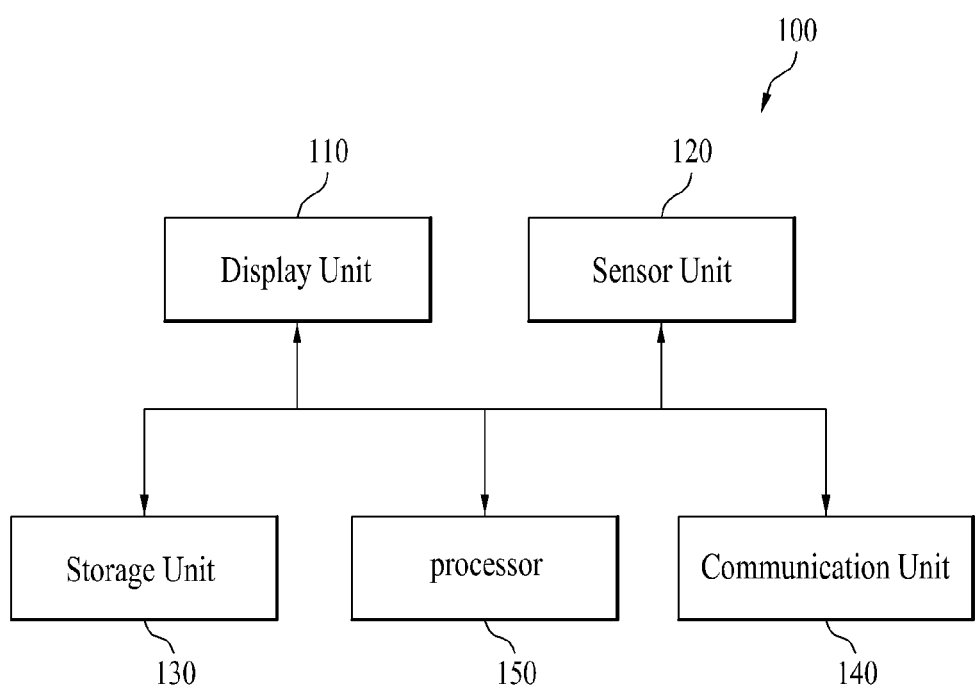
FIG. 1 is a block diagram illustrating a function of a mobile device in accordance with one embodiment.

FIG. 1 is a block diagram illustrating a function of a mobile device in accordance with one embodiment. FIG. 1 is only exemplary and some modules may be deleted or new modules may be additionally provided in accordance with the need of the person with ordinary skill in the art.

As shown in FIG. 1, a mobile device 100 according to one embodiment may include a display unit 110, a sensor unit 120, a storage unit 130, a display unit 140, and a processor 150.

The display unit 110 outputs image data on a display screen. The display unit 110 may output an image on the basis of contents or applications implemented by the processor 150 or a control command of the processor 150.

Also, the mobile device 100 according to one embodiment may provide a dual mode of a child mode and an adult mode. Accordingly, the display unit 110 may display at least one application implemented in the child mode and the adult mode. For example, the display unit 110 may display an icon corresponding to at least one application implemented in the child mode and the adult mode.

The sensor unit 120 may sense a peripheral environment of the mobile device 100 by using at least one sensor provided in the mobile device 100 and transfer the sensed result to the processor 150 in the form of a signal. Also, the sensor unit 120 may sense an input of a user and transfer an input signal based on the sensed result to the processor 150.

Accordingly, the sensor unit 120 may include at least one sensing means. According to one embodiment, the at least one sensing means may include a gravity sensor, a terrestrial magnetism sensor, a motion sensor, a gyroscope sensor, an acceleration sensor, an infrared sensor, an inclination sensor, a brightness sensor, an altitude sensor, a smell sensor, a temperature sensor, a depth sensor, a pressure sensor, a bending sensor, an audio sensor, a global positioning system (GPS) sensor, and a touch sensor.

Also, the sensor unit 120 refers to the aforementioned various sensing means, and may sense various inputs of the user and environment of the mobile device 100 and transfer the sensed result to the processor 150, whereby the processor 150 may perform the operation based on the sensed result. The aforementioned sensors may be included in the mobile device 100 as separate elements or may be incorporated into at least one element.

Also, if the display unit 110 includes a touch sensitive display, it may sense a user input such as a touch input.

Accordingly, the processor 150 may generate a control signal by using an input signal based on the user input through the sensor unit 120 or the display unit 110 and control the mobile device 100 by using the control signal.

In other words, the processor 150 may receive the user input through the sensor unit 120 or the display unit 110 as the input signal and generate the control signal by using the input signal. For example, the control signal may include a signal (hereinafter, referred to as 'unlock signal') for unlocking the lock state of the mobile device 100.

Also, the processor 150 may control the units included in the mobile device 100 in accordance with the control signal.

Hereinafter, if each step or operation performed by the mobile device starts is performed through the user input, it is to be understood that the procedure of generating the input signal and the control signal in accordance with the user input is included in the aforementioned description.

Also, it may be expressed that the processor controls the mobile device or the units included in the mobile device in accordance with the user input. The processor may be described to mean the mobile device.

The storage unit 130 may store various digital data such as audio, photos, moving pictures, and applications. The storage unit 130 refers to various digital data storage areas, such as a flash memory, a random access memory (RAM), and a solid state drive (SSD).

Also, the storage unit 130 may temporarily store data received from an external device through the communication unit 140. At this time, the storage unit 130 may be used for buffering for outputting the data, which are received from the external device, from the mobile device 100. In this case, the storage unit 130 may selectively be provided on the mobile device 100.

Also, the storage unit 130 may store information on at least one application implemented in a child mode and at least one application implemented in an adult mode.

The communication unit 140 may transmit and receive data to and from the external device by performing communication with the external device by using various protocols. Also, the communication unit 140 may transmit and receive digital data such as contents and applications to and from an external network by accessing the external network through wire or wireless.

In addition, although not shown in FIG. 1, the mobile device may include audio input and output units or a power unit.

The audio output unit (not shown) includes an audio output means such as a speaker and earphone. Also, the audio output unit may output voice on the basis of contents implemented in the processor 150 or the control command of the processor 150. At this time, the audio output unit may selectively be provided on the mobile device 100.

The power unit is a power source connected with a battery inside the device or an external power, and may supply the power to the mobile device 100.

Also, the mobile device 100 is shown in FIG. 1 as a block diagram. In FIG. 1, respective blocks are shown to logically identify the elements of the device. Accordingly, the aforementioned elements of the device may be provided as one chip or a plurality of chips in accordance with design of the device.

In the meantime, the mobile device according to one embodiment may provide a dual mode of a child mode and an adult mode. To this end, the mobile device according to one embodiment may provide two lock states of a first lock state and a second lock state, and may provide a first unlock interface for unlocking the first lock state and a second unlock interface for unlocking the second lock state. Hereinafter, a description as to a lock state set in accordance with a dual mode and when the lock state is set will be made, and a mode provided when the lock state is unlocked in accordance with the first unlock interface and the second unlock interface will be described.

First of all, the mobile device according to one embodiment may provide the first unlock interface that unlocks the first lock state. The first lock state is the state that input of the user or occurrence of an event is on standby. Accordingly, if the mobile device enters the first lock state, it may make a screen become an off state in the form of a dark screen until it detects the input of the user or occurrence of an event.

In other words, in order to reduce unnecessary power consumption, the mobile device may enter the first lock state if a previously set time passes without input of the user or occurrence of an event. At this time, the mobile device may enter the first lock state in a child mode or an adult mode. In other words, the mode for entering the first lock state is not limited to a specific mode, and the child mode and the adult mode may be the mode for entering the first lock state.

The mobile device of the first lock state is on standby for input of the user or occurrence of an event. If the mobile device detects the input of the user or occurrence of an event, it may provide the first unlock interface for unlocking the first lock state.

The first unlock interface is an unlock interface provided if the mobile device of the first lock state detects the input of the user or occurrence of an event. Also, the first unlock interface may unlock the first lock state and allow entrance to the child mode or adult mode.

In other words, the mobile device may unlock the first lock state and enter into the child mode or adult mode in accordance with the input signal of the user for the first unlock interface. To this end, the first unlock interface may allow a first unlock signal for entrance to the child mode and a second unlock signal for entrance to the adult mode.

If the mobile device detects the input signal for the first unlock interface, which is input by the user, it may determine whether the input signal is the first unlock signal for entrance to the child mode or the second unlock signal for entrance to the adult mode, and may enter into the child mode or the adult mode.

Figure 2:
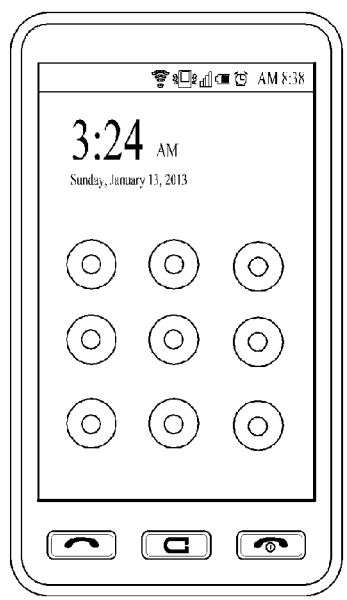
FIG. 2 is a diagram illustrating embodiments of a first unlock interface for unlocking a first lock state.
Figure 2:
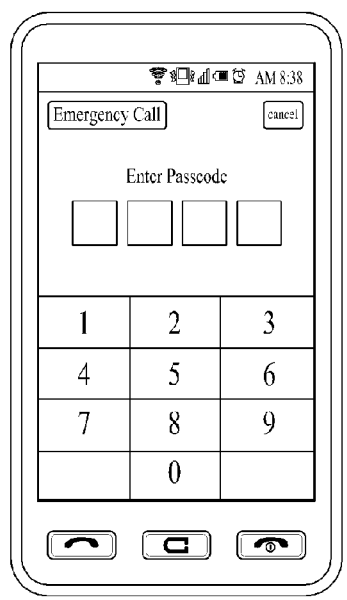
Figure 2:
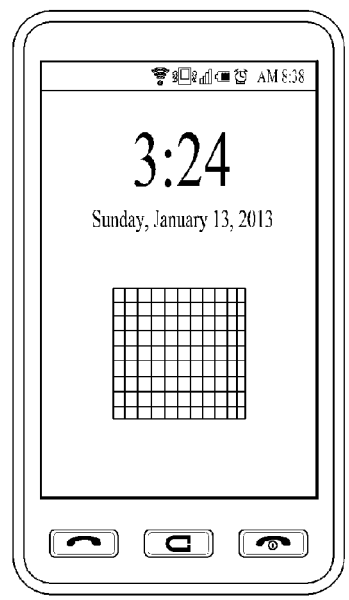

FIG. 2 is a diagram illustrating embodiments of a first unlock interface for unlocking a first lock state.

The mobile device may enter into the child mode or the adult mode by receiving an unlock signal from the user through the first unlock interface. The unlock signal may be the signal generated if the user performs a touch input in accordance with a pattern which is previously set, as shown in (a) of FIG. 2. Also, the unlock signal may be the signal generated if the user inputs a series of numbers which are previously set, as shown in (b) of FIG. 2. Also, the unlock signal may be the signal generated if a fingerprint of the user is input as shown in (c) of FIG. 2. At this time, the mobile device may further include a unit for fingerprint input to receive the fingerprint of the user.

As described above, the unlock signal is intended to unlock the lock state of the mobile device, and may have various types such as text, number, touch pattern, and fingerprint. The unlock signal is not limited to a specific type. However, the mobile device may sense touch and hovering of the user for the screen, and may also sense a motion of the user based on the mobile device through a gyroscope sensor and recognize a voice. Accordingly, the unlock signal may be generated by at least one of touch, hovering, fingerprint, motion and voice of the user.

Also, as shown in (a) to (c) of FIG. 2, even though the first unlock interface receives different types of unlock signals, it receives the first unlock signal for entering into the child mode separately from the second unlock signal for entering into the adult mode. In other words, if the mobile device detects the first unlock signal for the first unlock interface, it may provide an environment based on the child mode after unlocking the lock state. If the mobile device detects the second unlock signal, it may provide an environment based on the adult mode after unlocking the lock state.

In this respect, the unlock signal will be described as an example of the signal generated when the user performs a touch input in accordance with a pattern which is previously set, as shown in (a) of FIG. 2.

Figure 3:
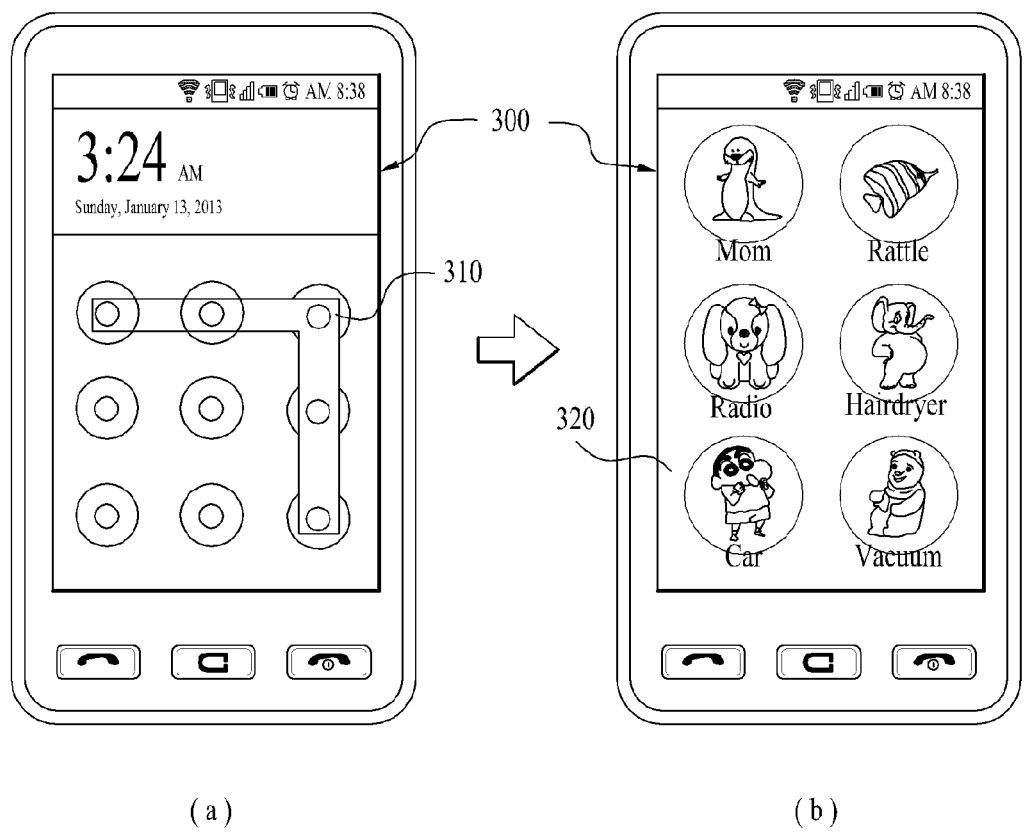
FIG. 3 is a diagram illustrating that a mobile device of a first lock state enters into a child mode through a first unlock signal for a first unlock interface in accordance with one embodiment.

FIG. 3 is a diagram illustrating that a mobile device of a first lock state enters into a child mode through a first unlock signal for a first unlock interface in accordance with one embodiment.

Since the child mode means that the user is a child, as shown in (a) of FIG. 3, the mobile device 300 may set a first unlock signal in accordance with a pattern 310 which is easy for children to remember or input. The mobile device 300 may basically provide the pattern 310 for the first unlock signal, and the user may previously set the pattern 310 for the first unlock signal through the mobile device 300.

If the mobile device 300 detects the first unlock signal, it may provide a user interface 320 implemented in the child mode as shown in (b) of FIG. 3. The user interface 320 may include at least one application implemented in the child mode.

As described above, if the mobile device 300 enters into the child mode, among at least one application installed in the mobile device 300, the application set to be performed in the child mode may only be displayed. The application which is not allowed to be used in the child mode cannot be displayed. This will be described in detail with reference to FIG. 10.

Figure 4:
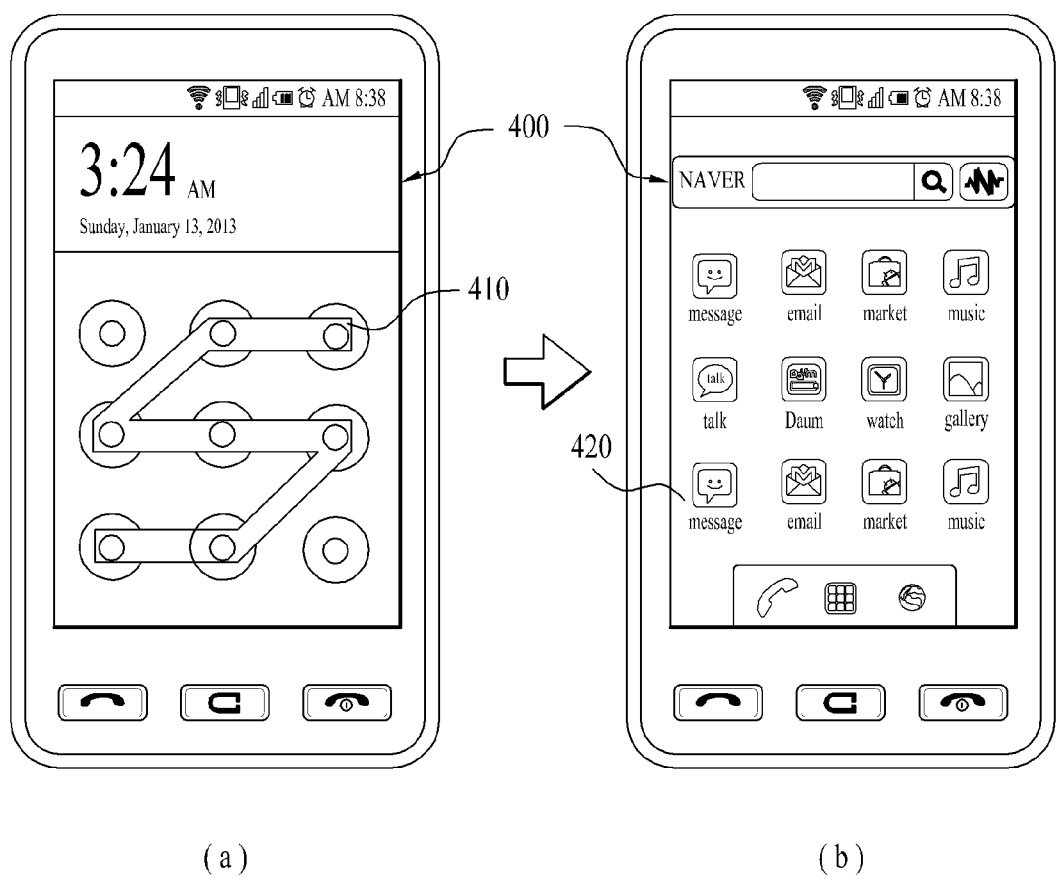
FIG. 4 is a diagram illustrating that a mobile device of a first lock state enters into an adult mode through a second unlock signal for a first unlock interface in accordance with one embodiment.

FIG. 4 is a diagram illustrating that a mobile device of a first lock state enters into an adult mode through a second unlock signal for a first unlock interface in accordance with one embodiment.

Since the adult mode means that the user is an adult, as shown in (a) of FIG. 4, the mobile device 400 may set a second unlock signal in accordance with a complicated pattern 410 which is difficult for children to unlock the lock state.

The mobile device 400 according to one embodiment may set a first unlock signal for entering into the child mode differently from a second unlock signal for entering into the adult mode. As a result, it is advantageous in that data of the mobile device may be prevented from being deleted due to mistake or error manipulation of the child and contents harmful to children may be blocked. Accordingly, if the pattern for the second unlock signal is the pattern which is difficult for the child to remember, the above advantages may be more increased.

Also, the mobile device 400 may basically provide the pattern 410 for the second unlock signal, and the user may previously set the pattern 410 for the second unlock signal through the mobile device 400.

If the mobile device 400 detects the second unlock signal, it may provide a user interface 420 implemented in the adult mode as shown in (b) of FIG. 4. The user interface 420 may include at least one application implemented in the adult mode.

If necessary, the user interface implemented in the adult mode may display all the applications installed in the mobile device 400. The user of the adult mode may identify the application implemented in the child mode by allowing the user of the adult mode to view the application implemented in the child mode, and may set the mode where the application is implemented. This will be described in more detail with reference to FIG. 10.

In the meantime, the mobile device may provide a call transmission and reception function, a message transmission and reception function and an e-mail transmission and reception function. At this time, if the child of the user receives a call or text message related to business of the user with using the mobile device of the user, a problem may occur in business of the user. Accordingly, the mobile device according to one embodiment may allow the above functions to be used in the adult mode only.

However, in case of a function in which event processing is important at the time when an event occurs, such as the function for call reception, the mobile device may allow the user to enter into the adult mode and process the corresponding event by notifying the user that the event has occurred even though it restricts event processing in the child mode. As a result, the mobile device according to one embodiment may allow the user to immediately process an event regarded by the user to be important or an event of which processing is important at the time when the event occurs. This will be described with reference to FIG. 5 and FIG. 6.

Figure 5:
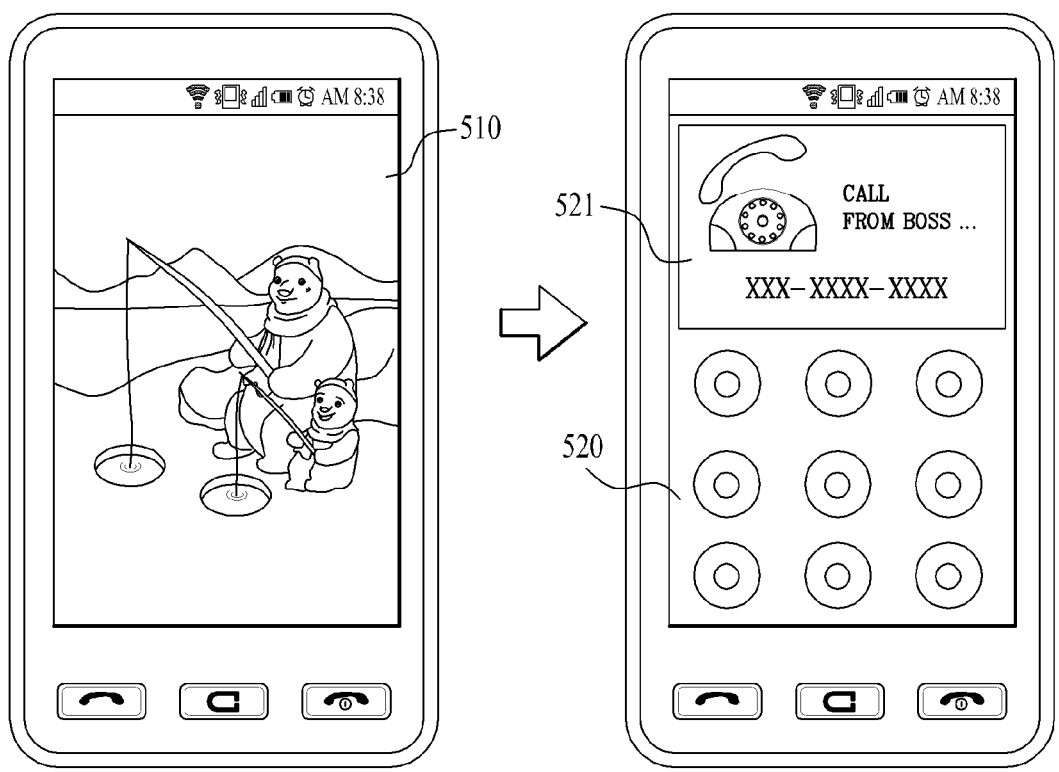
FIG. 5 is a diagram illustrating that an event for an adult mode occurs in a mobile device of a child mode in accordance with one embodiment.

FIG. 5 is a diagram illustrating that an event for an adult mode occurs in a mobile device of a child mode in accordance with one embodiment. It is assumed that the mobile device detects the first unlock signal for the first unlock interface unlocking the first lock state and enters into the child mode.

(a) of FIG. 5 illustrates that the mobile device of the child mode displays an implementation screen of a specific application 510 implemented in the child mode. When the mobile device of the child mode implements the specific application 510, it may detect an event for the adult mode.

The event means occurrence of an operation or work that affects implementation of an application or task of the mobile device, and may occur when an operation or work generated by the user occurs or data are received from an external device. For example, the mobile device may detect occurrence of the event if it receives a call, text message or e-mail.

However, if the mobile device is allowed to process such an event even in the child mode, a problem may occur in that the user of the mobile device may miss an important call or message due to the child. Accordingly, the mobile device may be set such that event processing cannot be processed in the child mode. In other words, the mobile device may process an event in the adult mode only. However, the mobile device of the child mode may detect occurrence of the event even though it cannot process the event. Accordingly, if the mobile device of the child mode detects occurrence of the event, it may enter into the adult mode to process the event.

If the mobile device detects an event for the adult mode in the child mode, as shown in (b) of FIG. 5, it may enter a second lock state and display a second unlock interface 520 that unlocks the mobile device of the second lock state. At this time, the second unlock interface 520 may display information 521 related to the detected event.

The second lock state is on standby for input of the user. If the mobile device detects the event for the adult mode in the child mode, it may enter the second lock state. Also, the mobile device may enter the second lock state and at the same time may display the second unlock interface that unlocks the second lock state.

Hereinafter, the first lock state and the second lock state, and the first unlock interface and the second unlock interface will be described in more detail.

First of all, the mobile device may enter the first lock state in the child mode or adult mode. In other words, the mobile device may enter the first lock state regardless of the fact that the current mode is the child mode or the adult mode if there is no input of the user or occurrence of an event until a previously set time passes.

On the other hand, the mobile device may enter the second lock state in the child mode only. In other words, the mobile device may enter the second lock state only if it detects the event for the adult mode in the current child mode.

Also, the mobile device that has entered the first lock state is on standby for input of the user or occurrence of the event. Accordingly, the mobile device that has entered the first lock state may provide the first unlock interface for unlocking the first lock state if it detect the input of the user or occurrence of the event.

On the other hand, the mobile device that has entered the second lock state is in the state that it detects the event for the adult mode. Accordingly, the mobile device may enter the second lock state and at the same time provide the second unlock interface for unlocking the second lock state.

In other words, the first unlock interface is provided if the input of the user or occurrence of the event is detected in the first lock state, whereas the second unlock interface may be provided at the same time when the mobile device enters the second lock state.

Also, the first unlock interface may allow both the first unlock signal for entering into the child mode and the second unlock signal for entering into the adult mode. However, the second unlock interface may allow only the second unlock signal for entering into the adult mode. This is because that the mobile device should enter into the adult mode to allow the user to process the event as the mobile device of the child mode detects the event for the adult mode. Accordingly, the second unlock interface may entrance to the adult mode only after unlocking the lock state.

Also, the second unlock interface is different from the first unlock interface, which receives the unlock signal only, in that it includes information on the event.

(b) of FIG. 5 illustrates that information 521 on an event includes caller information and caller number together with a call icon for notifying occurrence of an event for call reception. For example, if the mobile device detects an event for message reception, information related to the event may include at least one of message sender information, message sender number and message together with a message icon for notifying occurrence of the event for message reception. In other words, the information on the event may include information that may allow the user to identify the event, for example, information as to what the generated event is.

Figure 6:
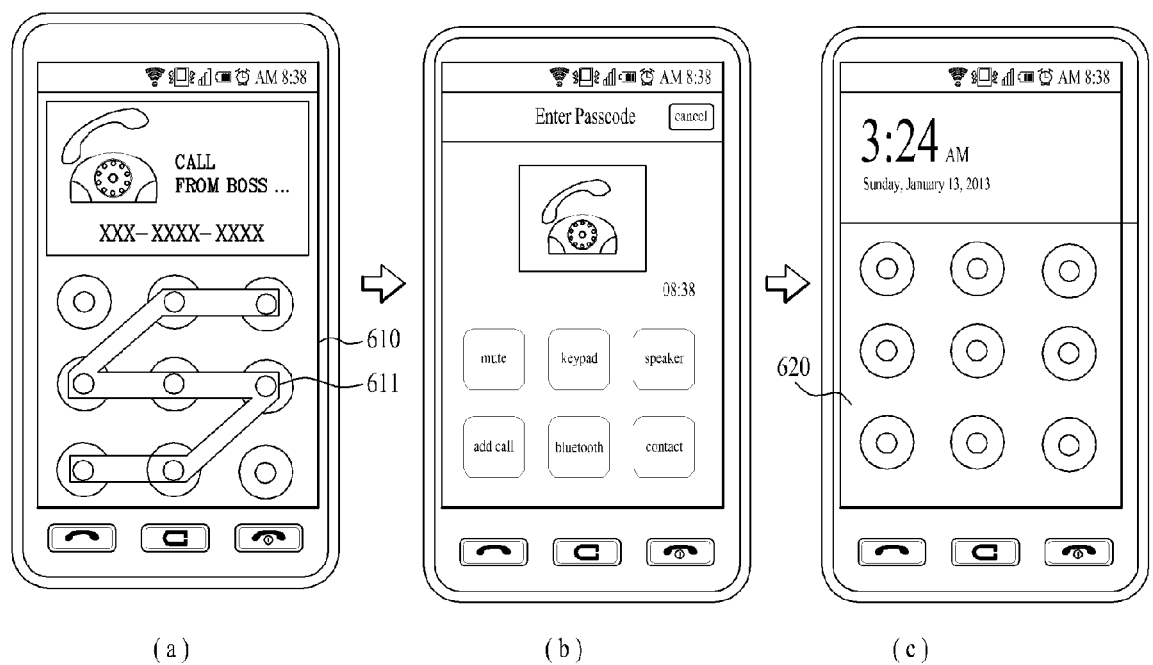
FIG. 6 is a diagram illustrating that a mobile device of a second lock state is unlocked by a second unlock interface in accordance with one embodiment.

FIG. 6 is a diagram illustrating that a mobile device of a second lock state is unlocked by a second unlock interface in accordance with one embodiment. In the same manner as FIG. 5, it is assumed that the mobile device of the child mode enters the second lock state by detecting the event for the adult mode and provides the second unlock interface.

As shown in (a) of FIG. 6, the mobile device may detect a second unlock signal 611 for the second unlock interface 610. The mobile device that has detected the second unlock signal 611 may unlock the second lock state and enter into the adult mode.

Also, the mobile device that has unlocked the second lock state through the second unlock interface 610 and entered into the adult mode may process the detected event. If the event detected by the mobile device is the event for call reception, as shown in (b) of FIG. 6, the mobile device may receive a call.

At this time, the mobile device may enter into the adult mode and at the same time process the event for call reception even though there is no separate input of the user. Even though the user does not perform a touch or input for a call, the operation of entrance to the adult mode through the second unlock interface 610 may be regarded as that for call reception. If the mobile device receives an input signal of the user, which is for event processing, after entering into the adult mode, it may process the detected event.

However, in the same manner as that a call ends, the mobile device that has completely processed the detected event may enter the first lock state as shown in (c) of FIG. 6, and may provide the first unlock interface 620 for unlocking the first lock state. As described above, the first unlock interface 620 may allow the first unlock signal for entering into the child mode and the second unlock signal for entering into the adult mode.

Accordingly, if the user intends to perform additional task in the adult mode, the user may unlock the first lock state by inputting the second unlock signal and enter into the adult mode. On the other hand, if the user desires to enter into the child mode to allow the child to use the mobile device, the user may unlock the first lock state by inputting the first unlock signal and enter into the child mode.

As described above, if the detected event is completely processed, the mobile device may enter the first lock state and provide the first unlock interface, whereby the user may enter into a desired mode to perform a desired task.

However, after the detected event is completely processed, it may be more preferable for the user that the mobile device continues to implement the application implemented in the child mode. Also, it may be more preferable that the mobile device maintains the adult mode to allow the user to perform additional task after the detected event is completely processed. This will be described in more detail with reference to FIG. 7 and FIG. 8.

Figure 7:
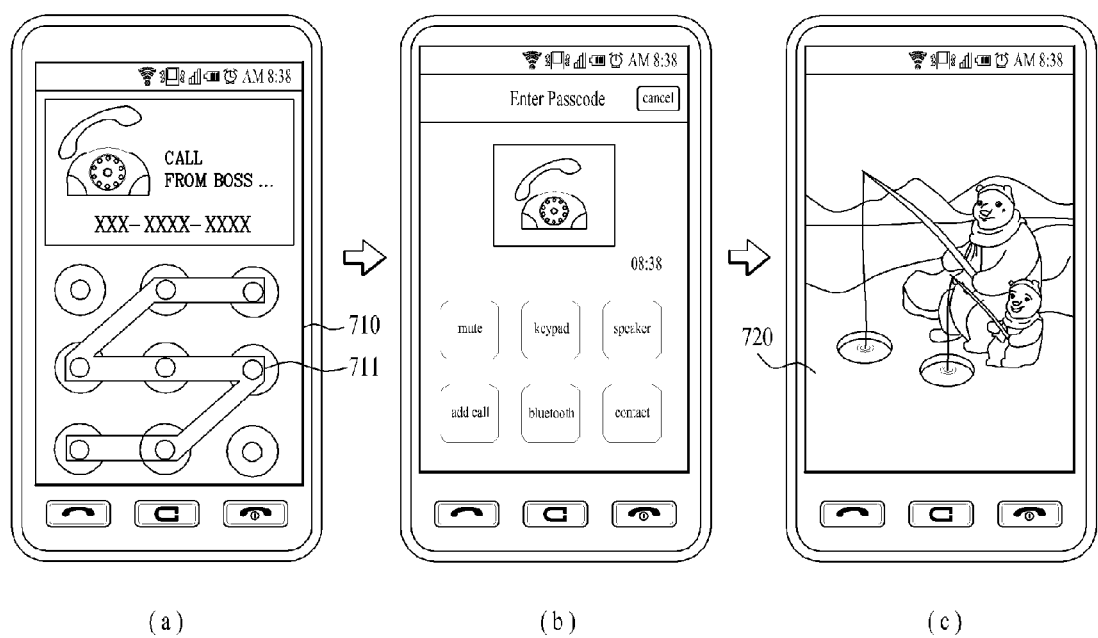
FIG. 7 is a diagram illustrating that a mobile device of a second lock state is unlocked by a second unlock interface in accordance with another embodiment.

First of all, FIG. 7 is a diagram illustrating that a mobile device of a second lock state is unlocked by a second unlock interface in accordance with another embodiment. In the same manner as FIG. 5, it is assumed that the mobile device of the child mode enters the second lock state by detecting the event for the adult mode and provides the second unlock interface.

As shown in (a) of FIG. 7, the mobile device may detect a second unlock signal 711 for a second unlock interface 710.

The mobile device that has detected the second unlock signal 711 may unlock the second lock state and enter into the adult mode.

Also, the mobile device that has entered into the adult mode may process the detected event. (b) of FIG. 7 illustrates an event for call reception as an example of the detected event. As described above, the mobile device may process the event simultaneously with unlocking the second lock state or may process the event if there is a request of the user after unlocking the second lock state.

At this time, if the detected event is completely processed, the mobile device may automatically be switched from the adult mode to the child mode. As a result, as shown in (c) of FIG. 7, the mobile device may continue to implement the application 720 implemented at the time when detecting the event.

Also, in a state that the mobile device displays the first unlock interface after entering the first lock state as shown in (c) of FIG. 6, if the user enters into the child mode through the first unlock signal, the mobile device may continue to implement the application implemented at the time when detecting the event.

However, as shown in (c) of FIG. 7, if the mobile device continues to implement the application which is being implemented, without entering the lock state, the user does not need to unlock the lock state, whereby convenience is improved. This is because that the adult has only to pass the mobile device to the child.

Figure 8:
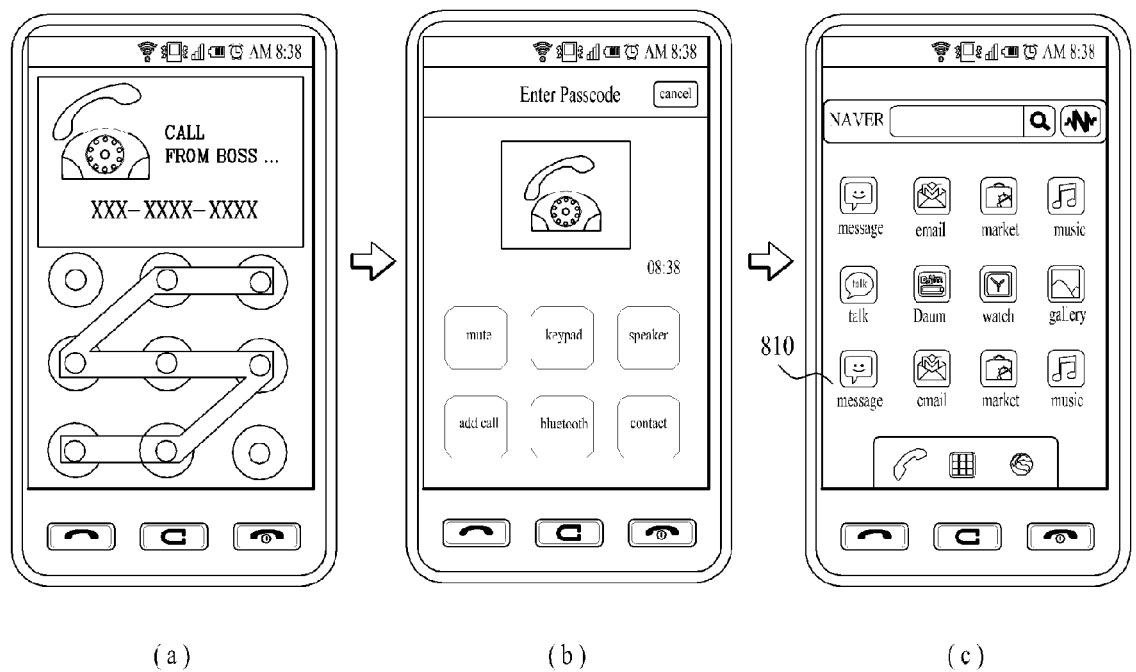
FIG. 8 is a diagram illustrating that a mobile device of a second lock state is unlocked by a second unlock interface in accordance with other embodiment.

FIG. 8 is a diagram illustrating that a mobile device of a second lock state is unlocked by a second unlock interface in accordance with other embodiment. In the same manner as FIG. 5, it is assumed that the mobile device of the child mode enters the second lock state by detecting the event for the adult mode and provides the second unlock interface. Also, since (a) of FIG. 8 and (b) of FIG. 8 are the same as (a) of FIG. 6 and (b) of FIG. 6 and (a) of FIG. 7 and (b) of FIG. 7, their detailed description will be omitted.

As shown in (a) of FIG. 8, if the mobile device detects a second unlock signal for a second unlock interface, it may unlock the second lock state and enter into the adult mode. Also, as shown in (b) of FIG. 8, the mobile device that has entered into the adult mode may process the detected event.

At this time, if the detected event is completely processed, the mobile device may provide a basic home screen 810 provided in the adult mode as shown in (c) of FIG. 8. The basic home screen may include an icon corresponding to at least one application implemented in the adult mode.

If the event for the adult mode occurs in the mobile device of the child mode, a task related to the event may be performed even after the event is completed. For example, the user who has ended a call may make an important note or should write and send a mail in respect of the call message. Accordingly, the mobile device according to one embodiment may allow the user to continue to perform a necessary task by maintaining the adult mode after processing the event.

Also, although the mobile device may continue to maintain the adult mode, it may maintain the adult mode for a previously set time after the event is completely processed and may switch the adult mode to the child mode after the previously set time is exceeded. For example, the mobile device may automatically switch the adult mode to the child mode if the previously set time is exceeded without input of the user or occurrence of the event after processing the event.

As described above, the mobile device may perform the task related to the event by maintaining the adult mode for a given time. Afterwards, the mobile device may return to the child mode to continue to implement the application implemented in the child mode, whereby user convenience may be increased.

In the meantime, as shown in (a) of FIG. 6, (a) of FIG. 7 and (a) of FIG. 8, if the mobile device of the child mode may enter the second lock state by detecting the event for the adult mode and displays the second unlock interface, it may disable the function for processing the event in the child mode.

For example, the mobile device that has received a call, that is, the mobile device that has detected the event for call reception may press a previously set button or reject a received call by touching a menu button on the screen. Alternatively, the mobile device that has detected the event for message reception, the event for mail reception, etc. may turn off an alarm function even though the user does not check the message or mail.

As described above, the rejection of the received call or turn-off of the alarm function for message reception or mail reception may be regarded as event processing. However, if the function for processing the event is able to be performed in the child mode, the user may miss the important event processing due to the child. Accordingly, the mobile device according to one embodiment of the present specification may disable the function for processing the event in the child mode by detecting the event for the adult mode in the child mode.

As described above, if the mobile device of the child mode detects the event for the adult mode, it may disable the function for processing the event in the child mode. Alternatively, if the mobile device of the child mode detects the event for the adult mode, since it enters the second lock state and displays the second unlock interface, it may disable the function for processing the event at the second lock state. Accordingly, the child may be prevented from rejecting the received call or the user may be prevented from missing the important call or message due to turn-off of the message alarm function.

Figure 9:
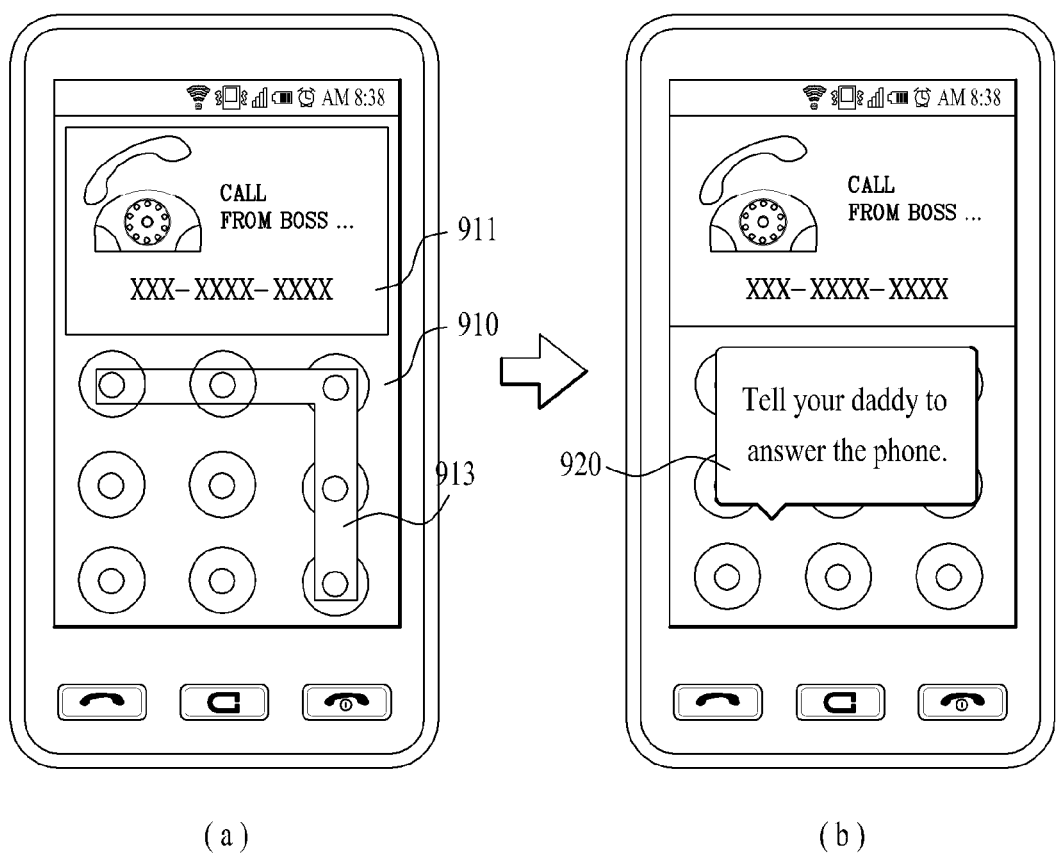
FIG. 9 is a diagram illustrating that a mobile device of a second lock state provides information guiding mode switching in accordance with one embodiment.

FIG. 9 is a diagram illustrating that a mobile device of a second lock state provides information guiding mode switching in accordance with one embodiment.

As shown in (a) of FIG. 9, if the mobile device of the child mode detects the event for the adult mode, it may enter the second lock state and provide a second unlock interface 910. The second unlock interface 910 may include information 911 related to the detected event. Also, the second unlock interface 910 may allow only a second unlock signal for entering into the adult mode. In other words, the second unlock interface 910 does not allow the first unlock signal for entering into the child mode.

However, as shown in (a) of FIG. 9, the mobile device may detect the first unlock signal 913 for entering into the child mode, with respect to the second unlock interface 910. This is because that the child who is using the mobile device in the child mode may input the first unlock signal 913 to enter into the child mode from the lock state. Accordingly, the mobile device may provide information 920 that guides mode switching from the child mode to the adult mode.

The information 920 guiding mode switching from the child mode to the adult mode may be displayed as a graphic image as shown in (b) of FIG. 9. However, the information guiding mode switching is not limited to the graphic image and may also be provided as a voice guide message.

In the meantime, at least one application provided in the mobile device according to one embodiment may include at least one application implemented in the child mode only, at least one application implemented in the adult mode only, and at least one application implemented in the child mode and the adult mode. Accordingly, the mobile device according to one embodiment may provide a first setup interface that configures a mode for implementing the provided application.

Figure 10:
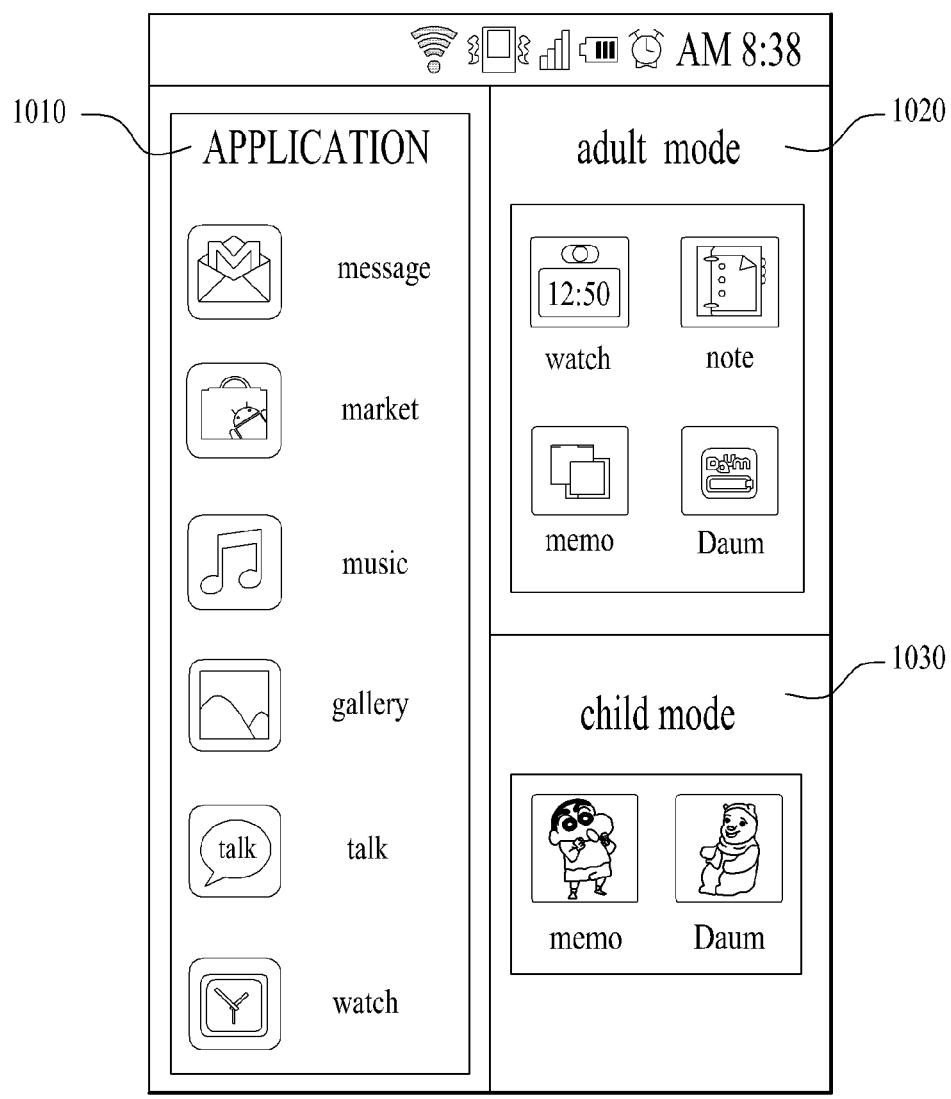
FIG. 10 is a diagram illustrating a first setup interface for an application provided by a mobile device in accordance with one embodiment.

FIG. 10 is a diagram illustrating a first setup interface for an application provided by a mobile device in accordance with one embodiment.

As shown in FIG. 10, the first setup interface may include an application interface 1010 displaying at least one application provided in the mobile device, an adult application interface 1020 displaying at least one application which will be implemented in the adult mode, and a child application interface 1030 displaying at least one application which will be implemented in the child mode.

The first setup interface may provide an environment where the user may shift an icon corresponding to the application included in the application interface 1010 to the adult application interface 1020 and the child application interface 1030 through an input method such as a touch.

At this time, the application included in the application interface 1010 may be shifted to the adult application interface 1020 and the child application interface 1030. In this case, the corresponding application may be implemented in both the adult mode and the child mode. In other words, the application may be implemented in the child mode only, or the adult mode only, and may be implemented in both the child mode and the adult mode in accordance with configuration.

Also, the first setup interface may be provided in the adult mode. This is because that it is not reasonable to allow the child, who is the user of the child mode, to determine an application and a mode to be implemented.

However, in case of the application which will be implemented in the child mode, the main user of the corresponding application is the child. Accordingly, the mobile device may provide a second setup interface, which configures an environment for implementing at least one application in the child mode, in the child mode.

Figure 11:
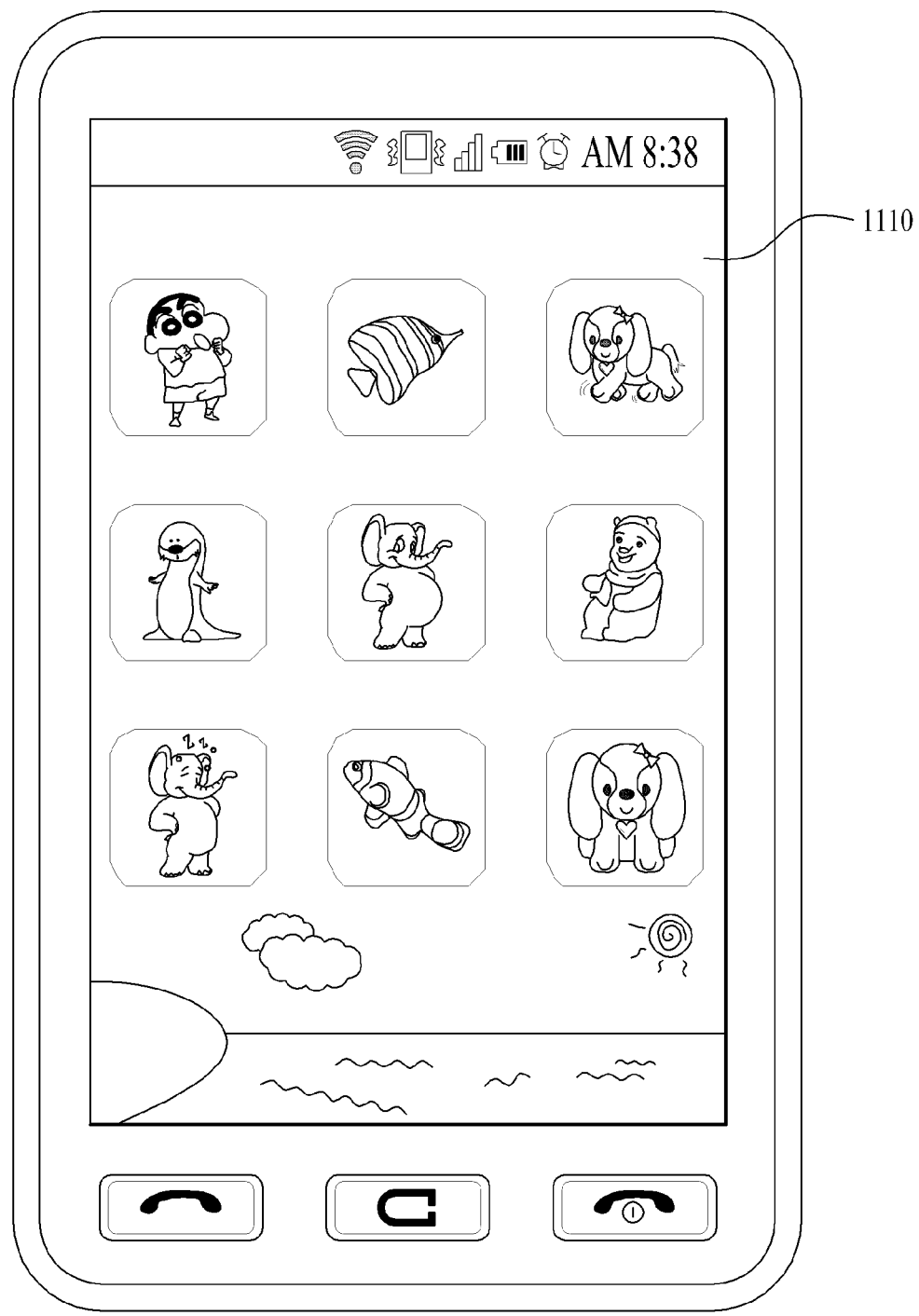
FIG. 11 is a diagram illustrating a second setup interface for an application provided by a mobile device in accordance with one embodiment.

FIG. 11 is a diagram illustrating a second setup interface for an application provided by a mobile device in accordance with one embodiment.

The second setup interface 1110 may configure an environment for implementing at least one application in the child mode. The environment may include all the items that may be configured by the user when the user implements the application, such as the time when the application is implemented, sound control when the application is implemented, and brightness control when the application is implemented.

Also, the second setup interface 1110 may provide a user interface (UI) that may easily configure the environment of the application to be implemented in the child mode. Accordingly, even in case of the same application, if the environment is configured in the child mode, a user interface different from the user interface provided in the adult mode may be provided to be acquainted with the child.

Figure 12:
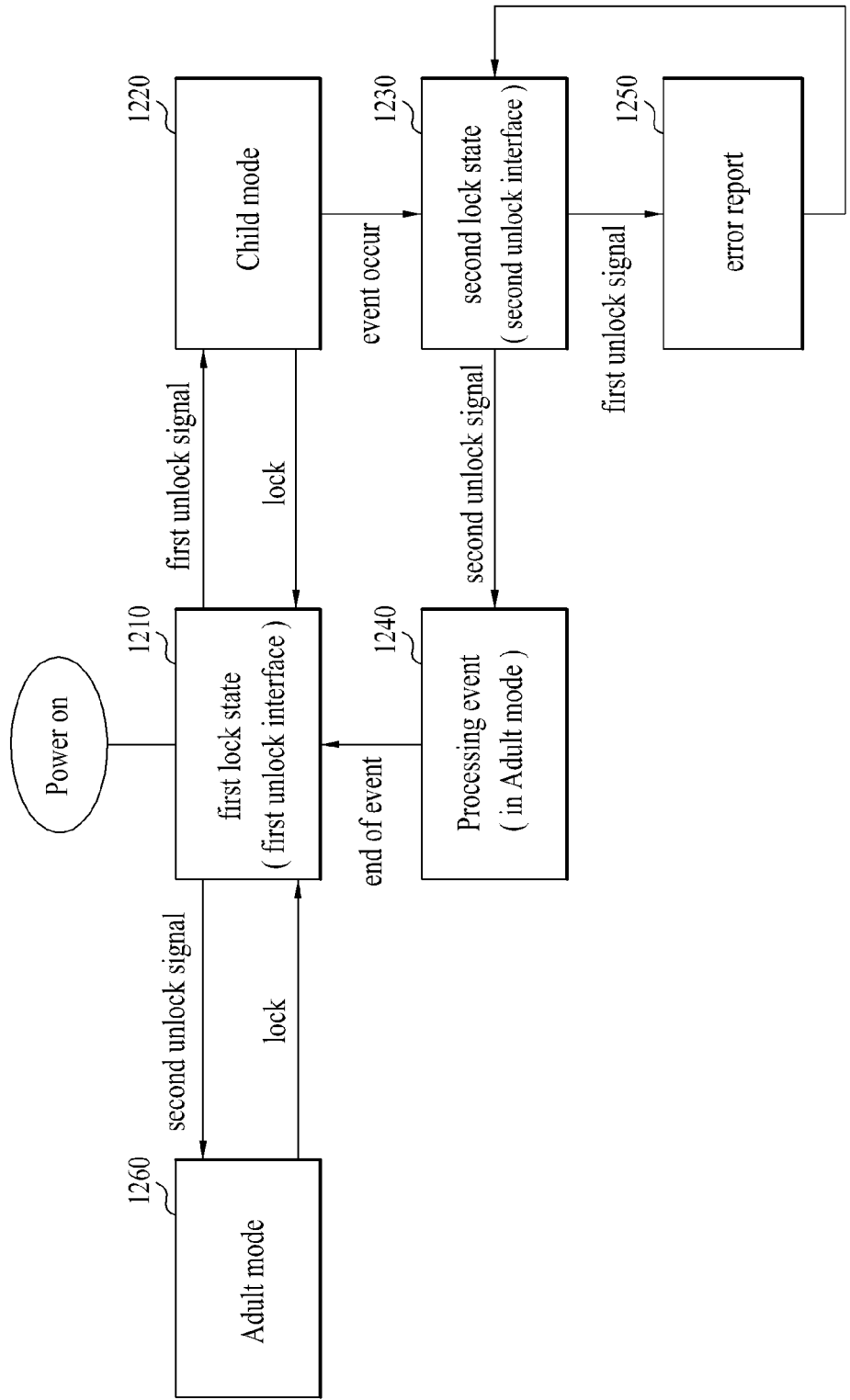
FIG. 12 is a block diagram illustrating that mode switching is performed between a child mode and an adult mode in a mobile device in accordance with one embodiment.

FIG. 12 is a block diagram illustrating that mode switching is performed between a child mode and an adult mode in a mobile device in accordance with one embodiment. Hereinafter, the mode switching procedure between the child mode and the adult mode will be described together with the first lock state and the second lock state.

If the mobile device is powered on, it may enter the first lock state 1210. The first lock state 1210 is the state that input of the user or occurrence of the event is on standby. The mobile device may configure the first lock state 1210 in case of the power-on state, and may provide the first unlock interface for unlocking the first lock state 1210 to allow the user to use the mobile device.

The mobile device of the first lock state 1210 may enter into the child mode 1220 or the adult mode 1260 in accordance with the unlock signal detected through the first unlock interface. The unlock signal may be configured previously, and may be varied after being configured.

In other words, if the mobile device of the first lock state 1210 detects the first unlock signal, it may enter into the child mode 1220. If the mobile device of the first lock state 1210 detects the second unlock signal, it may enter into the adult mode 1260.

In the meantime, after the mobile device of the first lock state 1210 enters into the child mode 1220 or the adult mode 1260, if there is no input of the user or occurrence of the event for a previously set time, or in accordance with the request of the user, the mobile device may enter the first lock state 1210. In this way, as the mobile device enters the first lock state from the child mode or the adult mode, it may reduce unnecessary power consumption, especially reduce unnecessary and frequent reaction of a touch sensor display.

Also, if the mobile device of the child mode 1220 detects the event for the adult mode, it may enter the second lock state 1230. The second lock state 1230 is the state that the input of the user is on standby. The mobile device may prepare entrance to the adult mode by entering the second lock state 1230 to process the detected event. In other words, if the mobile device detects the event for the adult mode, it may provide the second lock state and the second unlock interface to allow the user to input the second unlock signal for entering into the adult mode.

If the mobile device of the second lock state 1230 detects the second unlock signal for entering into the adult mode in accordance with the input of the user, it may enter into the adult mode to process the detect event (1240). At this time, the adult mode may be the same mode as the adult mode 1260 entering at the first lock state, and for convenience of description, these adult modes are shown at different blocks. However, the mobile device that has completely processed the event (1240) may enter the first lock state 1210, and may enter into the adult mode or the child mode in accordance with the configuration. This will be described in more detail with reference to FIG. 13 to FIG. 15.

In the meantime, if the mobile device of the second lock state 1230 detects the first unlock signal for entering into the child mode, in accordance with the input of the user, it may send an error report 1250 and maintain the second lock state 1230.

The second lock state 1230 may allow the entrance to the adult mode only unlike the first lock state that allows the entrance to the child mode and the adult mode. This is intended to process the event for the adult mode. Accordingly, if the mobile device receives the first unlock signal for entering into the child mode, it may send the error report 1250 to allow the user to input the second unlock signal for entering into the adult mode. At this time, the error report 1250 may include information guiding mode switching.

Figure 13:
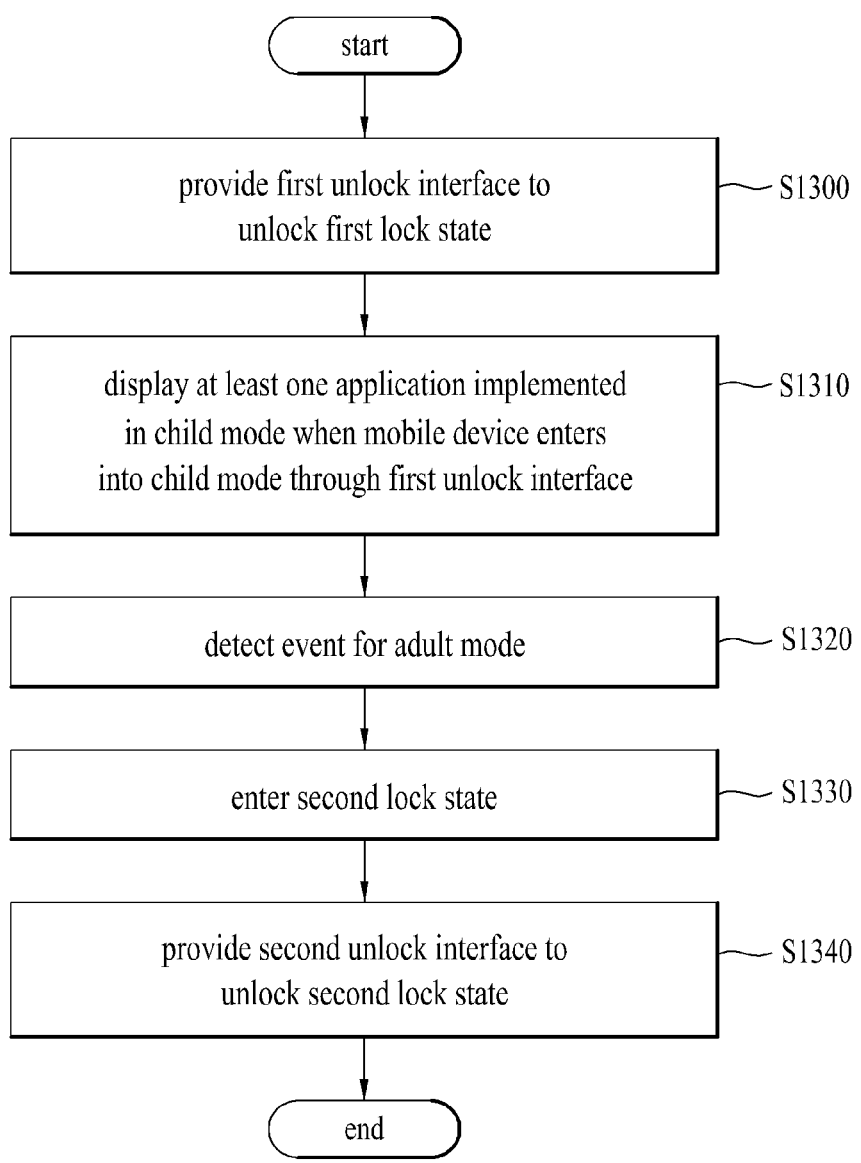
FIG. 13 is a flow chart illustrating a method for controlling a mobile device in accordance with one embodiment.

In the meantime, FIG. 13 is a flow chart illustrating a method for controlling a mobile device in accordance with one embodiment.

As described with reference to FIG. 2 to FIG. 4, the mobile device may provide the first unlock interface that unlocks the first lock state (S1300). Also, as described with reference to FIG. 3, if the mobile device enters into the child mode through the first unlock interface, it may display at least one application implemented in the child mode.

At this time, as described with reference to FIG. 5, the mobile device may detect the event for the adult mode (S1320). The event means occurrence of operation or work that affects implementation of the application or task. The event may occur when the operation or work generated by the user occurs or data are received from the external device.

As described with reference to FIG. 6 to FIG. 8, the mobile device that has detected the event may enter the second lock state (S1330), and may provide the second unlock interface that unlocks the second lock state (S1340). The second unlock interface may allow the entrance to the adult mode only. Accordingly, the mobile device may enter into the adult mode and process the detected event only if the user enters the second unlock signal for entering into the adult mode.

After the mobile device processes the detected event, it may enter into the child mode again and maintain the adult mode. Also, the mobile device may enter the first lock state and enter into the child mode or the adult mode in accordance with the unlock signal input by the user. In other words, the mode or lock state entering after the mobile device processes the detected event may be varied depending on the configuration. This will be described in detail with reference to FIG. 14 to FIG. 16.

Figure 14:
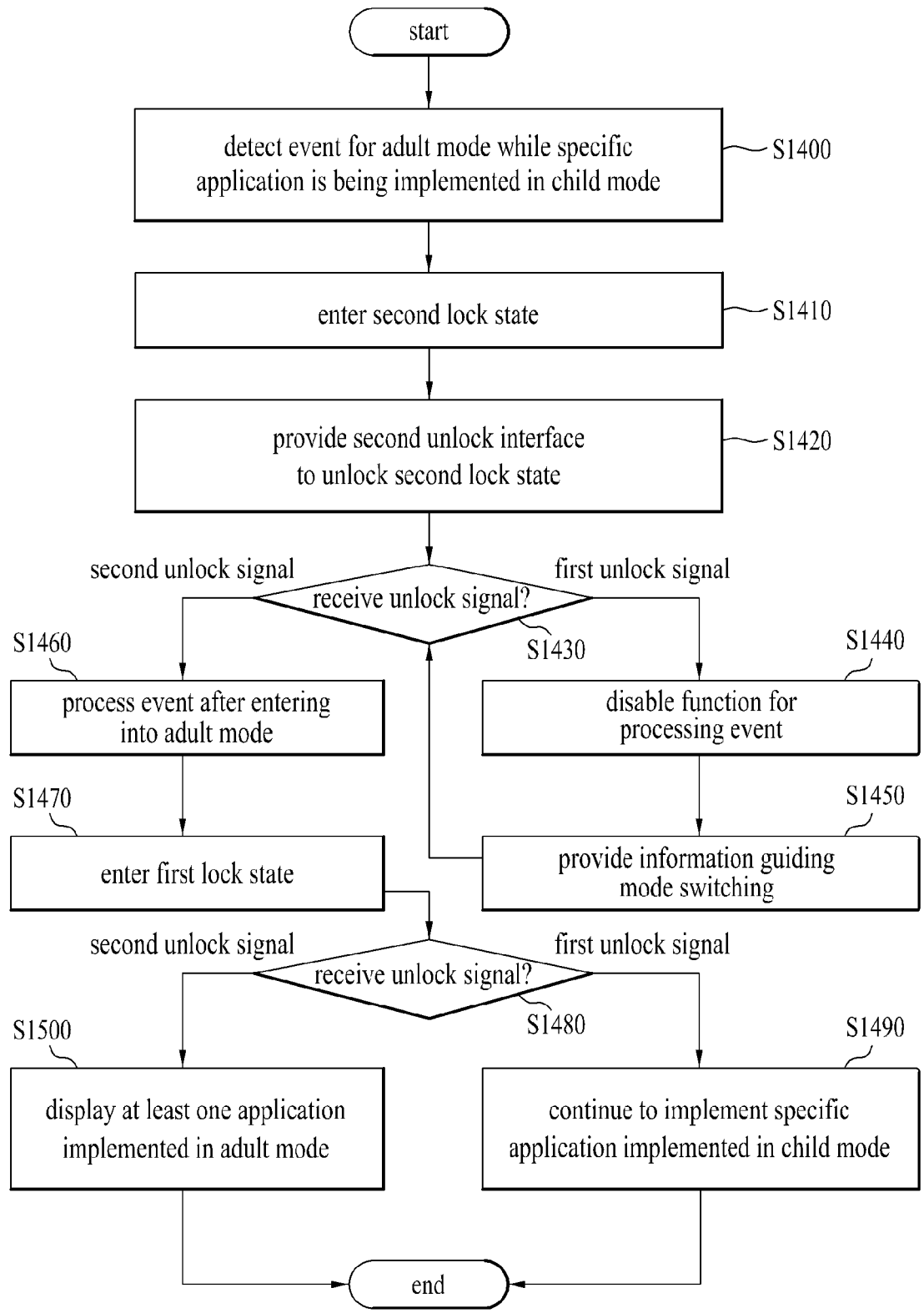
FIG. 14 is a flow chart illustrating a method for controlling a mobile device in accordance with another embodiment.

FIG. 14 is a flow chart illustrating a method for controlling a mobile device in accordance with another embodiment.

As described with reference to FIG. 5, the mobile device may detect the event for the adult mode while a specific application is being implemented in the child mode (S1400). The mobile device that has detected the event may enter the second lock state (S1410), and may provide the second unlock interface that unlocks the second lock state (S1420). The mobile device may enter the second lock state and provide the second unlock interface at the same time.

As described with reference to FIG. 6 to FIG. 8, the mobile device may detect whether the signal input by the user through the second unlock interface is the first unlock signal for entering into the child mode or the second unlock signal for entering into the adult mode (S1430).

The second unlock interface allows the entrance to the adult mode only. Accordingly, if the signal detected by the mobile device is the first unlock signal for entering into the child mode, the mobile device may disable the function for processing the detected event (S1440). This is intended to block event processing to prevent the event for the adult mode from being rejected to be processed or being processed in the child mode. Also, as described with reference to FIG. 9, the mobile device may provide information that guides mode switching (S1450).

Also, the mobile device may disable the function for processing the detected event in the child mode, if it detects the event, regardless of the detected signal of the first unlock signal or the second unlock signal.

In the meantime, if the signal detected by the mobile device is the second unlock signal for entering into the adult mode, the mobile device may process the event after entering into the adult mode (S1460).

At this time, if the mobile device detects the second unlock signal, it may enter into the adult mode and at the same time process the event. For example, if the event is the event for call reception, the mobile device may enter into the adult mode and at the same time connect a call. If the event is the event for message reception, the mobile device may enter into the adult mode and at the same time display the received message.

As described with reference to FIG. 6, the mobile device may enter the first lock state after completely processing the event (S1470). The mobile device may provide the user with an opportunity of selecting the adult mode or the child mode by entering the first lock state and displaying the first unlock interface.

The mobile device may detect whether the signal input by the user through the first unlock interface is the first unlock signal for entering into the child mode or the second unlock signal for entering into the adult mode (S1480). The first unlock interface may allow both the entrance to the child mode and the entrance to the adult mode unlike the second unlock interface that allows the entrance to the adult mode only.

As described with reference to FIG. 3, if the mobile device detects the first unlock signal, it may continue to implement the specific application which is being implemented in the child mode (S1490). If the user inputs the first unlock signal, it means that the user intends to continue to perform the work, which is being implemented before the event occurs, by entering into the child mode. Accordingly, the mobile device may continue to implement the specific application, which is being implemented before the event occurs, by entering into the child mode, whereby convenience of the user may be improved.

Also, as described with reference to FIG. 4, if the mobile device detects the second unlock signal, it may display at least one application implemented in the adult mode (S1500).

Figure 15:
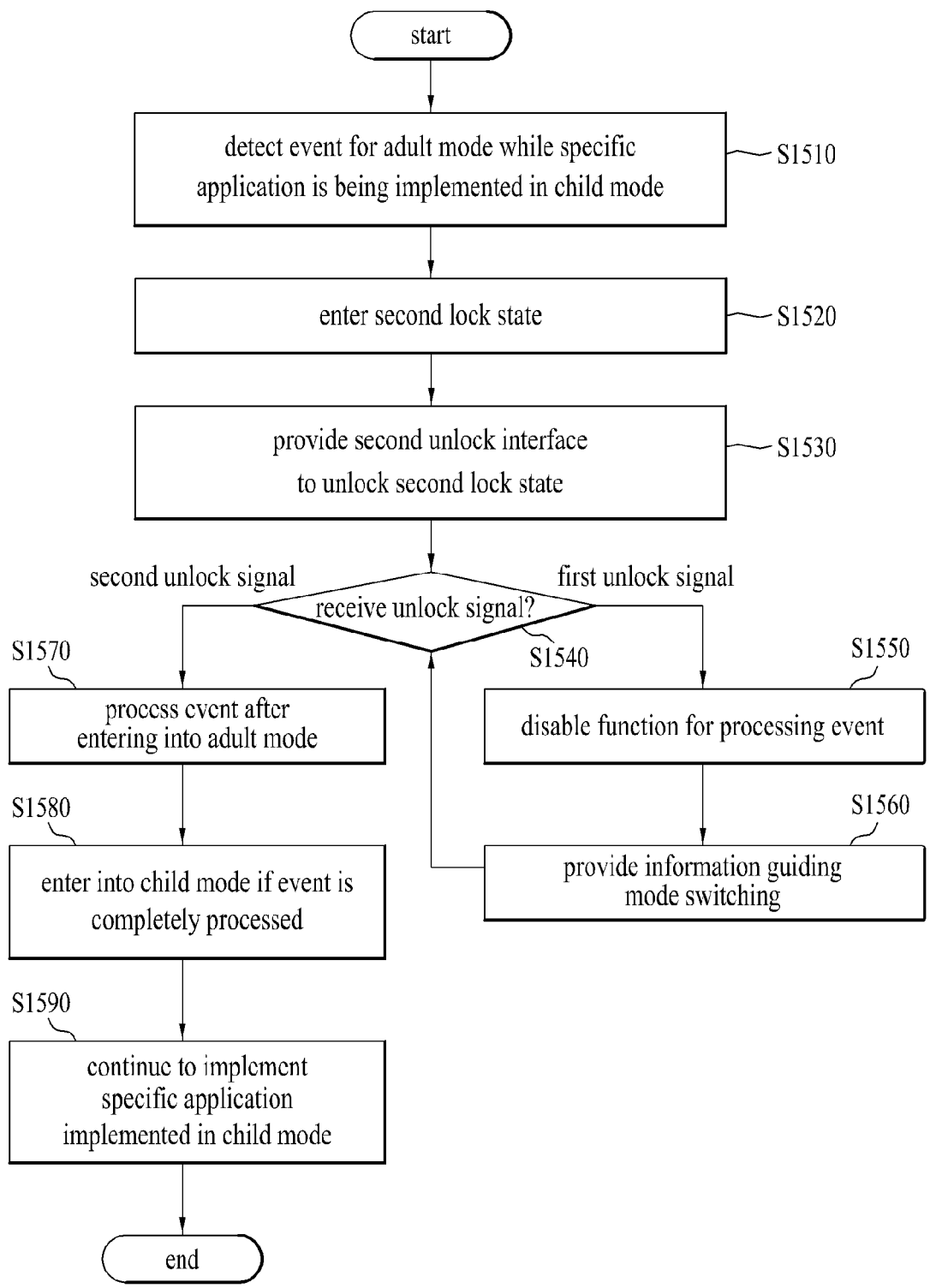
FIG. 15 is a flow chart illustrating a method for controlling a mobile device in accordance with still another embodiment.

FIG. 15 is a flow chart illustrating a method for controlling a mobile device in accordance with still another embodiment.

As described with reference to FIG. 5, the mobile device may detect the event for the adult mode while a specific application is being implemented in the child mode (S1510). The mobile device that has detected the event may enter the second lock state (S1520), and may provide the second unlock interface that unlocks the second lock state (S1530).

As described with reference to FIG. 6 to FIG. 8, the mobile device may detect whether the signal input by the user through the second unlock interface is the first unlock signal for entering into the child mode or the second unlock signal for entering into the adult mode (S1540).

The second unlock interface allows the entrance to the adult mode only. Accordingly, if the signal detected by the mobile device is the first unlock signal for entering into the child mode, the mobile device may disable the function for processing the detected event (S1550). This is intended to block event processing to prevent the event for the adult mode from being rejected to be processed or being processed in the child mode. Also, as described with reference to FIG. 9, the mobile device may provide information that guides mode switching (S1560).

In the meantime, if the signal detected by the mobile device is the second unlock signal for entering into the adult mode, the mobile device may process the event after entering into the adult mode (S1570).

As described with reference to FIG. 7, the mobile device may enter into the child mode again after completely processing the event (S1580). Also, the mobile device may continue to implement the specific application which is being implemented in the child mode (S1590).

As described above, if the event is completely processed, the mobile device may automatically enter into the mode before the event occurs. Accordingly, since the user does not need to take any action for mode switching, the user may feel convenience.

Figure 16:
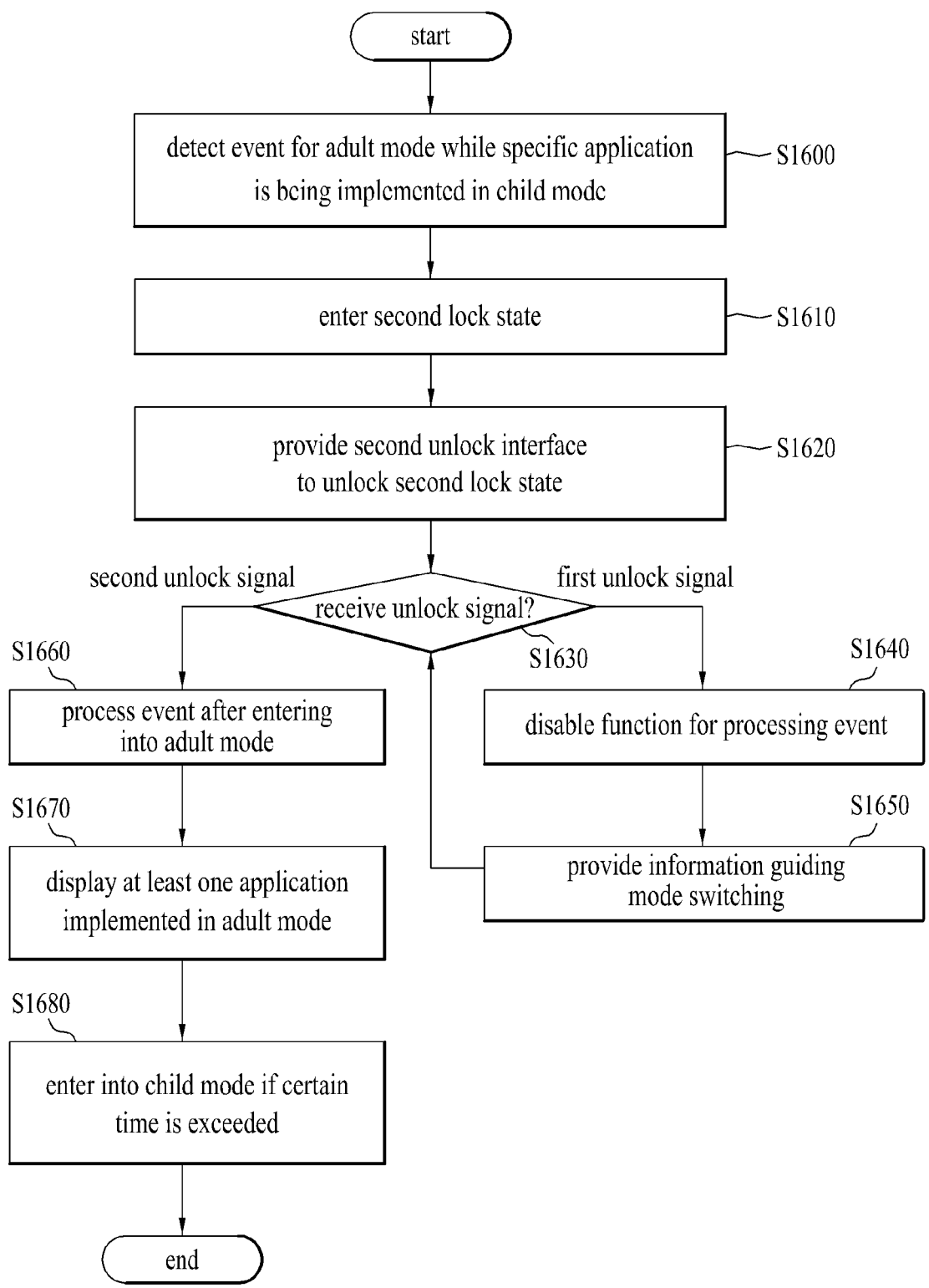
FIG. 16 is a flow chart illustrating a method for controlling a mobile device in accordance with further still another embodiment.

FIG. 16 is a flow chart illustrating a method for controlling a mobile device in accordance with further still another embodiment.

As described with reference to FIG. 5, the mobile device may detect the event for the adult mode while a specific application is being implemented in the child mode (S1600). The mobile device that has detected the event may enter the second lock state (S1610), and may provide the second unlock interface that unlocks the second lock state (S1620).

As described with reference to FIG. 6 to FIG. 8, the mobile device may detect whether the signal input by the user through the second unlock interface is the first unlock signal for entering into the child mode or the second unlock signal for entering into the adult mode (S1630).

The second unlock interface allows the entrance to the adult mode only. Accordingly, if the signal detected by the mobile device is the first unlock signal for entering into the child mode, the mobile device may disable the function for processing the detected event (S1640). This is intended to block event processing to prevent the event for the adult mode from being rejected to be processed or being processed in the child mode. Also, as described with reference to FIG. 9, the mobile device may provide information guiding mode switching (S1650).

In the meantime, if the signal detected by the mobile device is the second unlock signal for entering into the adult mode, the mobile device may process the event after entering into the adult mode (S1660).

As described with reference to FIG. 8, the mobile device that has completely processed the event may display at least one application implemented in the adult mode with maintaining the adult mode without performing separate mode switching (S1670).

Generally, after the event occurs, it is likely that the user may perform additional work by using the mobile device. Accordingly, the mobile device may maintain the adult mode for a certain time period without mode switching after the event ends, whereby the user may use the mobile device conveniently.

Also, if a certain time period is exceeded, the mobile device may automatically enter into the child mode (S1680) and continue to perform the work implemented in the child mode. In other words, if the mobile device detects the input of the user or occurrence of the event within a previously set time, it may continue to maintain the adult mode. However, if the mobile device fails to detect the input of the user or occurrence of the event within a previously set time, it may enter into the child mode.

Figure 17:
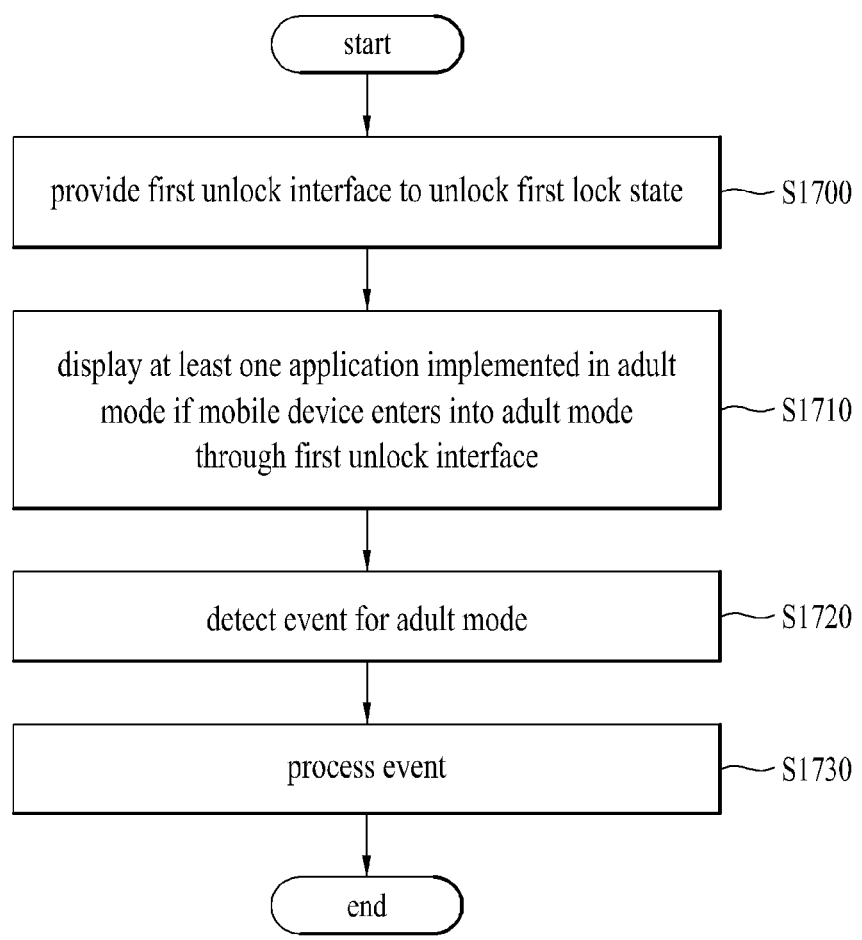
FIG. 17 is a flow chart illustrating a method for controlling a mobile device in accordance with further still another embodiment.

FIG. 17 is a flow chart illustrating a method for controlling a mobile device in accordance with further still another embodiment.

As described with reference to FIG. 2, the mobile device may provide the first unlock interface that unlocks the first lock state (S1700). Also, as described with reference to FIG. 4, if the mobile device enters into the adult mode through the first unlock interface, it may display at least one application implemented in the adult mode. Also, if the mobile device detects the event for the adult mode (S1720), it may process the event.

In other words, the mobile device may enter the second lock state if it detects the event for the adult mode, whereas the mobile device may immediately process the event without mode switching or entering the lock state.

Also, characteristics operated when the mobile device of the child mode detects the event for the adult mode may be applied to even the case that the mobile device of the adult mode detects the event for the child mode.

Moreover, although the description may be made for each of the drawings, the embodiments of the respective drawings may be incorporated to achieve a new embodiment. A computer readable recording medium where a program for implementing the embodiments is recorded may be designed in accordance with the need of the person skilled in the art within the scope of the present specification.

Also, the mobile device and the method for controlling the same according to one embodiment are not limited to the aforementioned embodiments, and all or some of the aforementioned embodiments may selectively be configured in combination so that various modifications may be made in the aforementioned embodiments.

In the meantime, the method for controlling the mobile device may be implemented in a recording medium, which can be read by a processor provided in the network device, as a code that can be read by the processor. The recording medium that can be read by the processor includes all kinds of recording media in which data that can be read by the processor are stored. Examples of the recording medium include ROM, RAM, CD-ROM, magnetic tape, floppy disk, and optical data memory. Also, another example of the recording medium may be implemented in a type of carrier wave such as transmission through Internet. Also, the recording medium that can be read by the processor may be distributed in a computer system connected thereto through the network, whereby codes that can be read by the processor may be stored and implemented in a distributive mode.

It will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

In this specification, both the product disclosure and the method disclosure have been described, and description of both may be made complementary if necessary.

What is claimed is:

1. A mobile device providing a dual mode of a first mode and a second mode, the mobile device comprising:
    a display unit configured to display at least one application executed in the first mode and the second mode respectively;
    a sensor unit configured to sense an input for the mobile device; and
    a processor configured to:
    provide an unlock interface to unlock a lock state of the first mode or the second mode, wherein the unlock interface allows the mobile device to enter into the first mode or the second mode after unlocking the lock state,
    display the at least one application executed in the first mode when the mobile device unlocks the first mode and enters into the first mode through the unlock interface,
    detect an event for the second mode in the first mode even though the second mode is in the lock state,
    indicate information related to the event for the second mode in the first mode, wherein the information is only notifying occurrence of the event and the event for the second mode is restricted to be processed in the first mode, and
    process the event when the mobile device unlocks the second mode and enters into the second mode through the unlock interface.

2. The mobile device according to claim 1, wherein the event includes at least one of an event for call reception, an event for message reception, and an event for mail reception.

3. The mobile device according to claim 1, wherein the related information includes at least one of message sender information, message sender number and a message icon for notifying the occurrence of the event, when the event is message reception.

4. The mobile device according to claim 1, wherein the related information includes at least one of caller information, caller number and a call icon for notifying occurrence of the event, when the event is call reception.

5. The mobile device according to claim 1, wherein the processing of the event includes displaying detail information of the event.

6. The mobile device according to claim 1, wherein the processor is further configured to continue to execute at least one application which is being executed in the first mode when detecting the event, after processing the event.

7. The mobile device according to claim 1, wherein the processor is further configured to switch the second mode to the first mode when the event is completely processed.

8. The mobile device according to claim 1, wherein the processor is further configured to switch the second mode to the first mode if an input signal or occurrence of an event are not detected for a predetermined time, after the event is completely processed.

9. The mobile device according to claim 1, wherein the lock state is a state that the processor is on standby to receive the user input or to detect the occurrence of the event.

10. The mobile device according to claim 1, wherein the lock state is unlocked by a first unlock signal for entering into the first mode or a second unlock signal for entering into the second mode for the first unlock interface.

11. The mobile device according to claim 1, wherein the first mode includes a guest mode and the second mode includes a user mode.

12. The mobile device according to claim 1, wherein the at least one application includes at least one of a first application executed only in the first mode, a second application executed only in the second mode, and a third application executed in both the first mode and the second mode.

13. The mobile device according to claim 1, wherein the processor is further configured to provide a first setup interface in the second mode and determine an executing mode of the at least one application between the first mode and the second mode through the first setup interface.

14. The mobile device according to claim 13, wherein the processor is further configured to provide a second setup interface in the first mode and configure an environment for executing the at least one application executed only in the first mode through the second setup interface.

15. The mobile device according to claim 1, wherein the processor is further configured to provide an information guiding mode switching from the first mode to the second mode when the mobile device detects the event for the second mode.

16. A method for controlling a mobile device, which provides a dual mode of a first mode and a second mode, the method comprising:
providing an unlock interface to unlock a lock state of the first mode or the second mode, wherein the unlock interface allows the mobile device to enter into the first mode or the second mode after unlocking the lock state,
displaying at least one application executed in the first mode when the mobile device unlocks the first mode and enters into the first mode through the unlock interface,
detecting an event for the second mode in the first mode even though the second mode is in the lock state,
indicating information related to the event in the first mode, wherein the information is only notifying occurrence of the event and the event is restricted to be processed in the first mode, and
processing the event when the mobile device unlocks the second mode and enters into the second mode through the unlock interface.

17. The method according to claim 16, wherein the event includes at least one of an event for call reception, an event for message reception, and an event for mail reception.

18. The method according to claim 16, wherein the related information includes at least one of message sender information, message sender number and a message icon for notifying the occurrence of the event, when the event is message reception.

19. The method according to claim 16, wherein the related information includes at least one of caller information, caller number and a call icon for notifying occurrence of the event, when the event is call reception.

20. The method according to claim 16, wherein the processing of the event includes displaying detail information of the event.

21. The method according to claim 16, further comprising:
continuing to execute at least one application which is being executed in the first mode when detecting the event, after processing the event.

22. The method according to claim 16, further comprising:
switching the second mode to the first mode when the event is completely processed.

23. The method according to claim 16, further comprising:
switching the second mode to the first mode if an input signal or occurrence of an event are not detected for a predetermined time, after the event is completely processed.

24. The method according to claim 16, wherein the lock state is a state that the processor is on standby to receive the user input or to detect the occurrence of the event.

25. The method according to claim 16, wherein the lock state is unlocked by a first unlock signal for entering into the first mode or a second unlock signal for entering into the second mode for the first unlock interface.

26. The method according to claim 16, wherein the first mode includes a guest mode and the second mode includes a user mode.

27. The method according to claim 16, wherein the at least one application includes at least one of a first application executed only in the first mode, a second application executed only in the second mode, and a third application executed in both the first mode and the second mode.

28. The method according to claim 16, further comprising:
providing a first setup interface in the second mode and determine an executing mode of the at least one application between the first mode and the second mode through the first setup interface.

29. The method according to claim 28, further comprising:
providing a second setup interface in the first mode and configure an environment for executing the at least one application executed only in the first mode through the second setup interface.

30. The method according to claim 16, further comprising:
providing information guiding mode switching from the first mode to the second mode when the mobile device detects the event for the second mode.

31. A mobile device providing a dual mode of a first mode and a second mode, the mobile device comprising:
a display unit configured to display at least one application executed in the first mode and the second mode respectively;
a sensor unit configured to sense an input for the mobile device; and a processor configured to:
provide an unlock interface to unlock a lock state of the first mode or the second mode, wherein the unlock interface allows the mobile device to enter into the first mode or the second mode,
display the at least one application executed in the first mode when the mobile device unlocks the first mode and enters into the first mode through the unlock interface,
display information related to an event for the second mode in the first mode, wherein the event for the second mode is occurred in the first mode, and the information is only notifying occurrence of the event in the first mode, and
display a detailed information related to the event when the mobile device unlocks the second mode and enters into the second mode through the unlock interface.

* * * * *